United States Patent Office 3,303,239
Patented Feb. 7, 1967

3,303,239
OLEFIN POLYMERIZATION
James W. Cleary and Ray A. Wickliffe, Bartlesville, Okla., assignors to Phillips Petroleum Company, a corporation of Delaware
No Drawing. Filed Dec. 23, 1963, Ser. No. 332,865
15 Claims. (Cl. 260—683.15)

This invention relates to catalysts. In one aspect this invention relates to the polymerization of olefins. In another aspect this invention relates to a method for forming liquid polymers from monoolefins. In still another aspect this invention relates to a catalyst system for polymerizing monoolefins to liquid polymers.

Low molecular weight olefins having 2 to 4 carbon atoms per molecule can be polymerized to liquid polymers which boil above 400° C. Such liquid polymers are generally described as oily polymers and find use as lubricants, generally motor lubricants, because they possess high viscosity and low pour points. Such polymers are also used as starting materials in the manufacture of detergents.

We have now discovered a new catalyst which has particular utility for polymerizing monoolefins to liquid polymers. The use of our catalyst system provides an improved method for polymerizing low molecular weight olefins with improved productivity over those methods known and used before.

An object of this invention is to provide an improved catalyst system. It is another object of this invention to provide an improved method for obtaining liquid polymers from low molecular weight olefins. Still another object of this invention is to provide liquid polymers of monoolefins which possess properties sutiable for use as lubricants.

Other aspects, objects and advantages of this invention will be apparent from further study of this disclosure and appended claims.

In accordance with this invention a new tricomponent catalyst system is provided comprising in combination a transition metal halide, an organoaluminum halide, and a triorganoboron.

Further in accordance with this invention monoolefins having 2 to 4 carbon atoms per molecule are polymerized to liquid polymers by contacting such olefins with our tricomponent catalyst system under polymerization conditions.

We have found that marked improvement in the polymerization process and results thereof when using our tricomponent catalyst system are not obtainable by any binary combination of the three ingredients we employ for polymerizing monoolefins to liquid polymers and are not obtainable by the catalyst systems known in the art.

The first component of our catalyst system is a halide of a transition metal defined by the formula $MX_a$ where M is a transition metal selected from the group consisting of metals in groups, IV–B, V–B, VI–B and VIII of the periodic table, as published in Lange's Handbook of Chemistry, 8th edition, 1952, pages 56–57. Such metals include titanium, zirconium, hafnium, vanadium, niobium, tantalum, chromium, molybdenum, tungsten, iron, cobalt, nickel, ruthenium, rhodium, palladium, osmium, iridium, and platinum. The X in the formula is a halogen selected from the group consisting of chlorine, bromine and iodine. The subscript $a$ in the formula is an integer equal to the valence of the selected metal M. Examples of such transition metal halides include titanium tetrachloride, titanium tetrabromide, titanium tetraiodide, titanium trichloride, titanium tribromide, vanadium tetrachloride, molybdenum pentachloride, hafnium tetrabromide, iron tribromide, palladium tetraiodide, platinum tetrachloride, and the like.

The second component of our catalyst system is an organoaluminum halide defined by the formula $R_bAlX_c$ where R is a 1 to 12 carbon radical selected from the group consisting of alkyl, cycloalkyl, and aryl radicals, and combinations thereof. The X of the formula is a halogen selected from the group consisting of chlorine, bromine and iodine. The subscripts $b$ and $c$ of the formula are integers of 1 and 2, the total of $b$ and $c$ being 3. Mixtures of these compounds can also be employed. Examples of the alkylaluminum halides are methylaluminum dichloride,
methylaluminum sesquichloride,
diethylaluminum chloride,
ethylaluminum sesquichloride,
ethylaluminum dibromide,
di-n-octylaluminum iodide,
2,4-diethylhexylaluminum chloride bromide,
n-decylaluminum dichloride,
ethylaluminum sesquibromide,
6-methylnonylaluminum sesquichloride,
di(3-ethylcyclohexyl)aluminum chloride,
2-methyl-3-n-propylcyclohexylaluminum chloride iodide,
dicyclopentylaluminum bromide,
3-cyclohexylbutylaluminum dichloride,
2-cyclopentylethylaluminum bromide iodide,
dodecylaluminum dichloride,
didodecylaluminum bromide,
di(3-cyclohexylphenyl)aluminum chloride iodide,
phenylaluminum dibromide,
di(4-phenylcyclohexyl)aluminum chloride,
3-ethylphenylaluminum bromide iodide,
di(2-ethyl-4-n-butylphenyl)aluminum iodide,
di(3,4-diisopropylhexyl)aluminum bromide,
dinaphthylaluminum chloride,
5-ethylnaphthylaluminum dibromide,
di(2-naphthylethyl)aluminum iodide,
naphthylaluminum sesquichloride,
cyclohexylaluminum sesquibromide,
cyclopentylaluminum sesquiiodide, and the like.

The third component of our catalyst system is a triorganoboron defined by the formula $BR_3$ where R is a 1 to 12 carbon radical as hereinbefore defined. Examples of triorganoborons include trimethylboron,
tri-n-butylboron,
tri-n-hexylboron,
tri-n-nonylboron,
tri(3,5-dimethyloctyl)boron,
methyl-n-propyl-n-hexylboron,
n-hexyl(isooctyl)(dodecyl)boron,
triphenylboron,
tricyclohexylboron,
tricyclopentylboron,
tri(3-phenylcyclohexyl)boron,
tri(4-cyclohexylphenyl)boron,
tri(2-n-propyl-3-isobutylcyclopentyl)boron,
trinaphthylboron,
tri(3,4-diisopropylphenyl)boron,
tri(4-phenyl-n-hexyl)boron,
naphthyl(3-phenylcyclohexyl)(4-cyclohexylphenyl)boron,
phenyl(cyclohexyl)(cyclopentyl)boron,
tri(3,4-di-n-propylcyclohexyl)boron,
tri(3-cyclohexyl)boron,
tri(4-cyclopentyl-n-heptyl)boron,
tri(5,7-dimethylnaphthyl)boron, and the like.

Any combination of at least one each of the defined transition metal halides, organoaluminum halides, and triorganoborons may be used as our three-component catalyst system for polymerizing low molecular weight monoolefins to liquid polymers. Also, any one, two or all three of the components of the catalyst system of this invention can include individual mixtures of the defined transition metal halides, the organoaluminum halides and the triorganoborons in combination.

For the production of liquid polymers the feedstock will generally be monoolefins having 2 to 4 carbon atoms per molecule. Such monoolefins include ethylene, propylene, 1-butene, 2-butene, and isobutylene. These monoolefins may be polymerized singularly to produce homopolymers or in any possible combinations to produce copolymers.

The polymerization reaction can be carried out batchwise or continuously. It will generally be conducted at a temperature in the range of 150 to 350° F., and preferably within the range of 175 to 250° F. The pressure employed for polymerization will generally be in the range of 100 to 1000 p.s.i.g., and preferably within the range of 250 to 750 p.s.i.g. Generally, the reaction will be conducted in the presence of a liquid diluent which is inert and nondeleterious to the reaction. The diluent is most generally a hydrocarbon, such as a paraffin or cycloparaffin, which has a boiling point below 400° F. The paraffins and cycloparaffins generally used will have 3 to 12, preferably 5 to 12, carbon atoms per molecule. Examples of suitable hydrocarbon diluents include propane, isobutane, normal pentane, isopentane, isooctane, methylcyclohexane, cyclohexane, decane, dodecane, and the like. Mixtures of these hydrocarbons can also be employed as the diluent.

For obtaining the best results of polymerization with our catalyst system, the mol ratio of the three components, transition metal halide to organoaluminum halide to triorganoboron, is in the range of 1:0.60:0.5 to 1:3:5, preferably in the range of 1:0.75:0.75 to 1:2:3.5. The ratio of the transition metal halide to the monoolefin is in the range of 1 millimol:.05 mol to 1 millimol:10 mols, preferably in the range 1 millimol:1 mol to 1 millimol:5 mols.

When a diluent is employed in the polymerization, the ratio of diluent to olefin is generally not in excess of 20 to 1 on a weight basis. Preferably, from 0.4 to 10 parts by weight of diluent are employed for each part of olefin. The reaction time can cover a relatively broad range; generally it will be from a minute or less to 10 hours or more, and preferably from 1 to 5 hours.

When the polymerization is completed, the catalyst can be deactivated and the liquid polymers can be separated from the polymerization mixture by suitable methods, which are well known in the art.

Advantages of this invention are illustrated by the following example which is presented to illustrate the invention but is not intended to be limiting to the specific monomers, catalysts and conditions employed.

EXAMPLE

A series of 10 runs was conducted in which propylene was polymerized with a catalyst as defined by our invention. The catalyst ingredients were placed in a reactor vessel, the reactor was flushed with propylene and 150 grams of propylene was added in each run. In runs 1–7 and 10, 100 ml. of normal pentane was added as a diluent. In the other runs no diluent was used. The system was heated to 225° F. and stirred for 4 hours. At the end of the reaction period excess propylene was vented, normal pentane was added to dissolve the reactor contents, and then filtered through a column of Attapulgus clay to remove catalyst residue. The normal pentane was then flashed from the polymer. Other conditions which were varied in the polymerization of the various runs and results are listed in the following table:

Table

| Run No. | Millimols | | | Productivity, g. polymer/g. TiCl$_4$ |
|---|---|---|---|---|
| | TiCl$_4$ | Al Compd.[1] | Bu$_3$B[2] | |
| 1 | 0.0 | 1.25 | 2.0 | |
| 2 | 0.0 | 1.0 | 2.0 | |
| 3 | 1.0 | 0.0 | 1.0 | Trace |
| 4 | 1.0 | 1.0 | 0.0 | [3] 13 |
| 5 | 1.0 | 1.0 | 1.0 | 306 |
| 6 | 1.0 | 1.0 | 2.0 | 381 |
| 7 | 1.0 | 1.0 | 3.0 | 343 |
| 8 | 1.0 | 1.25 | 2.0 | 357 |
| 9 | 1.0 | 1.5 | 2.0 | 157 |
| 10 | 1.0 | 1.5 | 3.0 | 79 |

[1] Diethylaluminum chloride was used in Runs 2, 4, 5, 6, 7 and 10. Ethylaluminum sesquichloride, an equimolar mixture of ethylaluminum dichloride and diethylaluminum chloride, was used in Runs 1, 8, and 9.
[2] Tri-n-butylboron.
[3] Mixture of solid and liquid polymers.

| Polymer ex Run No. | Avg. Osmometric Molecular Weight | Avg. No. C$_3$H$_6$ Units per Molecule | Viscosity, Saybolt Sec.[1] | | |
|---|---|---|---|---|---|
| | | | 100° F. | 210° F. | Index |
| 5 | 392 | 9.3 | 186.2 | 45.43 | 97 |
| 6 | 366 | 8.7 | 121.7 | 40.97 | 93 |
| 7 | 354 | 8.4 | 94.1 | 38.41 | 75 |
| 8 | 365 | 8.7 | (²) | (²) | (²) |
| 9 | 319 | 7.6 | 57.2 | 40.19 | [3] >150 |
| 10 | 435 | 10.4 | 345.2 | 55.08 | 101 |

[1] ASTM D 445-61.
[2] Insufficient sample.
[3] Outside range of chart used for calculation of viscosity index.

The above example makes apparent the advantages of our three-component catalyst system in polymerizing monoolefins to liquid polymers, as shown by the viscosities of the polymers produced. The productivity of the reaction is shown to be greatly improved in runs 5–10 over similar runs 1–4 employing only a binary catalyst system. The viscosity index values show the lubricity characteristics of the polymers produced.

Various modifications of this invention will be evident to those skilled in the art which may be followed without departing from the spirit and scope of the invention.

That which is claimed is:

1. A method of forming liquid polymers comprising contacting monoolefins having 2 to 4 carbon atoms per molecule with a catalyst system which forms on mixing materials consisting essentially of (1) a transition metal halide of the general formula $MX_a$ where M is a transition metal selected from the group IV–B of the periodic table, X is a halogen selected from the group consisting of chlorine, bromine, and iodine, and $a$ is an integer equal to the valence of M; (2) an organoaluminum halide of the general formula $R_bAlX_c$ where R is a 1 to 12 carbon organo radical, X is a halogen selected from the group consisting of chlorine, bromine and iodine, and $b$ and $c$ are integers of 1 and 2, the total of $b$ and $c$ being 3; and (3) triorganoboron of the general formula $BR_3$ where R is a 1 to 12 carbon organo radical; the mol ratio of components (1), (2) and (3) being in the range of 1:0.6:0.5 to 1:3:5, the concentration of component (1) (millimols) to olefin feed (mols) being in the range of 1:0.05 to 1:10.0, at a temperature in the range of 150 to 350° F., and at a pressure in the range of 100 to 1000 p.s.i.g.

2. The method of claim 1 wherein said transition metal is the plus 4 valence state.

3. A method of forming liquid polymers comprising contacting monoolefins having 2 to 4 carbon atoms per molecule with a catalyst system which forms on mixing materials consisting essentially of (1) titanium tetrahalide wherein the halide is selected from the group consisting of chlorine, bromine and iodine; (2) an organoaluminum halide of the general formula $R_bAlX_c$ where R is a 1 to 12 carbon organo radical, X is a halogen selected from the group consisting of chlorine, bromine and iodine, and $b$ and $c$ are integers of 1 and 2, the total of $b$ and $c$ being 3; and (3) triorganoboron of the general formula $BR_3$ where R is a 1 to 12 carbon organo radical; the mol ratio of components (1), (2) and (3) being in the range of 1:0.6:0.5 to 1:3:5, the concentration of component (1) (millimols) to olefin feed (mols) being in the range of 1:0.05 to 1:10.0, at a temperature in the range of 150 to 350° F., and at a pressure in the range of 100 to 1000 p.s.i.g.

4. The method of claim 3 wherein said organo aluminum halide is diethylaluminum chloride.

5. The method of claim 3 wherein said olefin to be polymerized is propylene.

6. A method of forming liquid polymers which comprises contacting propylene with a catalyst system which forms on mixing (1) titanium tetrachloride, (2) diethylaluminum chloride; (3) tri-n-butylboron; the mol ratio of components (1), (2) and (3) being in the range of 1:0.6:0.5 to 1:3:5, the ratio of component (1) to propylene feed being in the range of from about 1:50 to about 1:10,000 at a temperature in the range of from about 150 to about 350° F., and at a pressure in the range of from about 100 to about 1000 p.s.i.g.

7. The method of claim 6 wherein the ratio of said components (1), (2) and (3) is in the range of from about 1:0.75:0.75 to about 1:2:3, respectively; said ratio of component (1) to propylene is in the range of from about 1:1000 to about 1:5000, said temperature is in the range of from about 175 to about 250° F., and said pressure is in the range of from about 250 to about 750 p.s.i.g.

8. A method of forming liquid polymers comprising contacting monoolefins having 2 to 4 carbon atoms per molecule with a catalyst system which forms on mixing materials consisting essentially of (1) a transition metal halide of the general formula $MX_a$ where M is a transition metal selected from the group consisting of metals in group IV–B of the periodic table, X is a halogen selected from the group consisting of chlorine, bromine and iodine, and $a$ is an integer equal to the maximum valence of M; (2) an organoaluminum halide of the general formula $R_bAlX_c$ where R is a 1 to 12 carbon organo radical, X is a halogen selected from the group consisting of chlorine, bromine and iodine, and $b$ and $c$ are integers of 1 and 2, the total of $b$ and $c$ being 3; and (3) triorganoboron of the general formula $BR_3$ where R is a 1 to 12 carbon organo radical; the mol ratio of components to olefin feed (mols) being in the range of 1:0.05 to 1:3:5, the concentration of component (1) (millimols) to olefin feed (molds) being in the range of 1:0.05 to 1:10.0, at a temperature in the range of 150 to 350° F., and at a pressure in the range of 100 to 1000 p.s.i.g.

9. The method of claim 8 wherein the mixture of olefin and catalyst further comprises a suitable diluent.

10. The method of claim 8 wherein said monoolefin is propylene; said catalyst system forms on mixing (1) titanium tetrachloride, (2) one member of the group consisting of diethylaluminum chloride and ethyl aluminum sesquichloride and (3) tri-n-butylboron in a mol ratio in the range of 1:0.75:0.75 to 1:2:3, respectively; said concentration of $TiCl_4$ (millimols) to propylene (mols) is in the range of 1:1 to 1:5, said temperature is in the range of 175 to 250° F., and said pressure is in the range of 250 to 750 p.s.i.g.

11. The method of claim 10 wherein ethylaluminum sesquichloride is employed.

12. The method of claim 10 wherein said mixture of olefin and catalyst further comprises n-pentane as a diluent.

13. A catalyst composition which forms on mixing materials consisting essentially of (1) a transition metal halide of the general formula $MX_a$ where M is a transition metal selected from the group consisting of metals in group IV–B of the periodic table, X is a halogen selected from the group consisting of chlorine, bromine and iodine, and $a$ is an integer equal to the maximum valence of M; (2) an organoaluminum halide of the general formula $R_bAlX_c$ where R is a 1 to 12 carbon organo radical, X is a halogen selected from the group consisting of chlorine, bromine and iodine, and $b$ and $c$ are integers of 1 and 2, the total of $b$ and $c$ being 3; and (3) trialkylboron of the general formula $BR_3$ where R is a 1 to 12 carbon organo radical.

14. A catalyst composition which forms on mixing material consisting essentially of (1) a transition metal halide of the general formula $MX_a$ where M is a transition metal selected from the group consisting of metals in group IV–B of the periodic table, X is a halogen selected from the group consisting of chlorine, bromine and iodine, and $a$ is an integer equal to the maximum valence of M; (2) an organoaluminum halide of the general formula $R_bAlX_c$ where R is a 1 to 12 carbon organo radical, X is a halogen selected from the group consisting of chlorine, bromine and iodine, and $b$ and $c$ are integers of 1 and 2, the total of $b$ and $c$ being 3; and (3) triorganoboron of the general formula $BR_3$ where R is a 1 to 12 carbon organo radical; the mol ratio of components (1), (2) and (3) being in the range of 1:0.6:0.5 to 1:3:5.

15. A catalyst composition which forms on mixing material consisting essentially of (1) titanium tetrachloride, (2) diethylaluminum chloride and (3) tri-n-butylboron in a mol ratio in the range of 1:0.75:0.75 to 1:2:3, respectively.

References Cited by the Examiner

UNITED STATES PATENTS

| | | | |
|---|---|---|---|
| 2,922,782 | 1/1960 | Hay | 252—429 |
| 3,113,167 | 12/1963 | Sauer | 260—683.15 |
| 3,160,672 | 12/1964 | Pearson et al. | 252—431 |
| 3,180,894 | 4/1965 | Lang et al. | 260—606.5 |

DELBERT E. GANTZ, *Primary Examiner.*

R. H. SHUBERT, *Assistant Examiner.*